(12) United States Patent
Lundby

(10) Patent No.: US 8,605,686 B2
(45) Date of Patent: Dec. 10, 2013

(54) METHOD AND APPARATUS FOR POWER CONTROL IN A WIRELESS COMMUNICATION SYSTEM

(75) Inventor: Stein A. Lundby, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1951 days.

(21) Appl. No.: 09/782,751

(22) Filed: Feb. 12, 2001

(65) Prior Publication Data
US 2002/0111183 A1 Aug. 15, 2002

(51) Int. Cl.
*H04B 7/005* (2006.01)

(52) U.S. Cl.
USPC ........... 370/335; 370/342; 370/318; 370/329; 455/522; 455/69

(58) Field of Classification Search
USPC ............. 455/522, 515, 560, 561, 68, 69, 122; 370/318, 320, 329, 335, 342, 441
See application file for complete search history.

(56) References Cited

U.S. PATENT DOCUMENTS

| | | | |
|---|---|---|---|
| 5,507,018 A | | 4/1996 | Seppala |
| 5,539,728 A | * | 7/1996 | Gaiani et al. .................. 370/342 |
| 5,542,107 A | * | 7/1996 | Kay ............................... 455/513 |
| 5,548,812 A | | 8/1996 | Padovani et al. |
| 5,566,165 A | | 10/1996 | Sawahashi et al. |
| 5,740,168 A | * | 4/1998 | Nakamura et al. ............ 370/347 |
| 5,799,005 A | * | 8/1998 | Soliman ......................... 370/335 |
| 5,809,422 A | * | 9/1998 | Raleigh et al. ................ 455/449 |
| 5,812,938 A | | 9/1998 | Gilhousen et al. |
| 5,828,659 A | * | 10/1998 | Teder et al. .................... 370/328 |
| 5,881,368 A | * | 3/1999 | Grob et al. ...................... 455/69 |
| 5,884,196 A | * | 3/1999 | Lekven et al. ................ 455/574 |
| 5,887,023 A | * | 3/1999 | Mabuchi ....................... 375/133 |
| 5,893,035 A | * | 4/1999 | Chen ............................. 455/522 |
| 5,943,362 A | * | 8/1999 | Saito ............................. 375/143 |
| 5,982,760 A | * | 11/1999 | Chen ............................. 370/335 |
| 6,014,565 A | * | 1/2000 | Bonta ............................ 455/437 |
| RE36,591 E | * | 2/2000 | Hayashi et al. ............... 370/342 |
| 6,034,971 A | * | 3/2000 | Love et al. .................... 370/468 |
| 6,035,196 A | * | 3/2000 | Hengeveld et al. ........... 455/437 |
| 6,038,220 A | * | 3/2000 | Kang et al. .................... 370/252 |

(Continued)

FOREIGN PATENT DOCUMENTS

CN 1200008 A 11/1998
CN 1130963 3/2002

(Continued)

OTHER PUBLICATIONS

3GPP TS.25.214 V7.20 (Sep. 06).

(Continued)

*Primary Examiner* — Temesgh Ghebretinsae
*Assistant Examiner* — Richard Chan
(74) *Attorney, Agent, or Firm* — Michelle S. Gallardo

(57) ABSTRACT

Method and Apparatus for performing power control on the power control commands transmitted on a forward link in a wireless communication system. The power level of the power control bits on the forward link are adjusted in response to power commands received on the reverse link. The mobile station measures the power level of the adjusted power control bits to measure the quality of the forward link.

32 Claims, 8 Drawing Sheets

(56) References Cited

U.S. PATENT DOCUMENTS

| | | | |
|---|---|---|---|
| 6,044,070 A * | 3/2000 | Valentine et al. | 370/316 |
| 6,047,015 A * | 4/2000 | Watanabe et al. | 375/132 |
| 6,058,107 A * | 5/2000 | Love et al. | 370/332 |
| 6,067,458 A * | 5/2000 | Chen | 455/522 |
| 6,070,085 A * | 5/2000 | Bender et al. | 455/522 |
| 6,072,778 A * | 6/2000 | Labedz et al. | 370/252 |
| 6,072,990 A * | 6/2000 | Agrawal et al. | 455/69 |
| 6,075,974 A * | 6/2000 | Saints et al. | 455/69 |
| 6,085,106 A * | 7/2000 | Sendonaris et al. | 455/522 |
| 6,112,080 A * | 8/2000 | Anderson et al. | 455/422.1 |
| 6,137,789 A * | 10/2000 | Honkasalo | 370/342 |
| 6,144,646 A * | 11/2000 | Bohlmann et al. | 370/311 |
| 6,148,216 A | 11/2000 | Osaki | |
| 6,151,512 A * | 11/2000 | Chheda et al. | 455/562.1 |
| 6,160,999 A * | 12/2000 | Chheda et al. | 455/69 |
| 6,233,439 B1 | 5/2001 | Jalali | |
| 6,256,301 B1 * | 7/2001 | Tiedemann et al. | 370/342 |
| 6,269,239 B1 * | 7/2001 | Hashem et al. | 455/69 |
| 6,330,456 B1 * | 12/2001 | Hashem et al. | 455/522 |
| 6,396,867 B1 * | 5/2002 | Tiedemann et al. | 375/141 |
| 6,405,021 B1 | 6/2002 | Hamabe | |
| 6,434,367 B1 * | 8/2002 | Kumar et al. | 455/70 |
| 6,483,816 B2 | 11/2002 | Tsunehara et al. | |
| 6,498,785 B1 * | 12/2002 | Derryberry et al. | 370/311 |
| 6,512,931 B1 * | 1/2003 | Kim et al. | 455/522 |
| 6,539,234 B1 * | 3/2003 | Hiramatsu et al. | 455/522 |
| 6,603,773 B2 | 8/2003 | Laakso et al. | |
| 6,615,053 B1 * | 9/2003 | Lee et al. | 455/522 |
| 6,636,746 B1 * | 10/2003 | Hashem et al. | 455/522 |
| 6,788,937 B1 * | 9/2004 | Willenegger et al. | 455/434 |
| 2002/0105929 A1 * | 8/2002 | Chen et al. | 370/335 |
| 2003/0123413 A1 * | 7/2003 | Moon et al. | 370/335 |
| 2004/0066772 A1 * | 4/2004 | Moon et al. | 370/342 |

FOREIGN PATENT DOCUMENTS

| | | |
|---|---|---|
| CN | 1126930 | 4/2002 |
| EP | 1134913 | 9/2001 |
| JP | 8032513 A | 2/1996 |
| JP | 10-173594 | 6/1998 |
| JP | 11-331072 | 11/1999 |
| JP | 11-340909 | 12/1999 |
| JP | 2000286793 A | 10/2000 |
| JP | 2000349704 A | 12/2000 |
| WO | 96/04718 A1 | 2/1996 |
| WO | 9818212 | 4/1998 |
| WO | 9849785 | 11/1998 |
| WO | WO9849785 A1 | 11/1998 |
| WO | 9949595 | 9/1999 |
| WO | 9953630 | 10/1999 |
| WO | WO 99/53630 * | 10/1999 |
| WO | 9956405 | 11/1999 |
| WO | WO0027045 | 5/2000 |
| WO | 0031893 | 6/2000 |
| WO | 0036762 | 6/2000 |
| WO | WO 00/31893 A2 | 6/2000 |
| WO | WO 0036762 * | 6/2000 |
| WO | 0054430 | 9/2000 |
| WO | WO0054430 | 9/2000 |
| WO | WO0108323 | 2/2001 |
| WO | 0265663 | 2/2002 |
| WO | 0223764 | 3/2002 |
| WO | 0243273 | 5/2002 |

OTHER PUBLICATIONS

International Search Report-PCT-US02-03729-International Search Authority—European Patent Office Sep. 16, 2002.

European Search Report—EP08011856—Search Authority—The Hague—Jul. 30, 2008.

European Search Opinion—EP08011856—Search Authority—The Hague—Jul. 30, 2008.

International Preliminary Report on Patentability—PCT/US2002/003729, International Search Authority—IPEA/US—Alexandria, Virginia—Nov. 9, 2004.

European Search Report—EP08011855, Search Authority—The Hague—Jul. 22, 2008.

European Search Opinion- EP08011855, Search Authority—The Hague—Jul. 22, 2008.

Translation of Office Action in Japanese application 2002-564856 corresponding to U.S. Appl. No. 09/782,751, citing JP11331072, WO9949595, JP10173594, JP11340909 and JP2000286793 dated Apr. 11, 2002.

* cited by examiner

METHOD AND APPARATUS FOR POWER CONTROL IN A WIRELESS COMMUNICATION SYSTEM

BACKGROUND

1. Field

The present invention relates generally to communication, and more specifically to power control in a wireless communication system.

2. Background

Increasing demand for wireless data transmission and the expansion of services available via wireless communication technology have led to the development of systems capable of handling voice and data services. One spread spectrum system designed to handle the various requirements of these two services is a Code Division Multiple Access, CDMA, system referred to as cdma2000, which is specified in "TIA/EIA/IS-2000 Standards for CDMA2000 Spread Spectrum Systems."

As the amount of data transmitted and the number of transmissions increase, the limited bandwidth available for radio transmissions becomes a critical resource. There is a need, therefore, for an efficient and accurate method of transmitting information in a communication system that optimizes use of available bandwidth.

SUMMARY

Embodiments disclosed herein address the above stated needs by a remote station apparatus having a link quality estimation unit operative to generate a link quality estimate in response to a first power control instruction received on a common channel, and a power control unit coupled to the link quality estimation unit, the power control unit operative to generate a second power control instruction in response to the link quality estimate.

According to an alternate aspect, a base station apparatus includes a decoder, and a determination unit coupled to the decoder, the determination operative to determine a power control instruction for base station transmission on a common channel, and an adjustment unit coupled to the determination unit, the adjustment unit operative to adjust a power level of the power control instruction.

According to still another aspect, a base station apparatus includes a control processor for power control of transmission of power control instructions on a common channel, and an amplifier operative to adjust a power level of the power control instructions.

In one aspect, a wireless communication system includes a first power control unit operative to transmit reverse link power control instructions on a common channel, and a second power control unit operative to adjust transmission power of the reverse link power control instructions in response to forward link power control instructions received on a reverse link.

In another aspect, a method for power control in a wireless apparatus operative in a communication system having a forward link and a reverse link, the system transmitting power control bits on a forward link common channel, includes measuring a SNR of at least one power control bit for controlling a reverse link, and determining a power control decision for the forward link based on the SNR.

In still another aspect, a method for power control in a wireless communication system, the system having a forward link and a reverse link, the system transmitting power control instructions on a forward link common channel, includes determining a first power control instruction for control of the reverse link, in response to receiving a second power control instruction on the reverse link, the second power control instruction for control of the forward link, determining a first transmission power level, and transmitting the first power control instruction at the first transmission power level on the common channel.

In yet another aspect, a method for power control in a wireless communication system, the system having a forward link and a reverse link, the system transmitting power control instructions on a forward link common channel, includes generating a reverse link power control instruction, generating a forward link power control instruction, and adjusting a power level for transmission of the forward link power control instruction according to the reverse link power control instruction.

DETAILED DESCRIPTION

Figure 1:
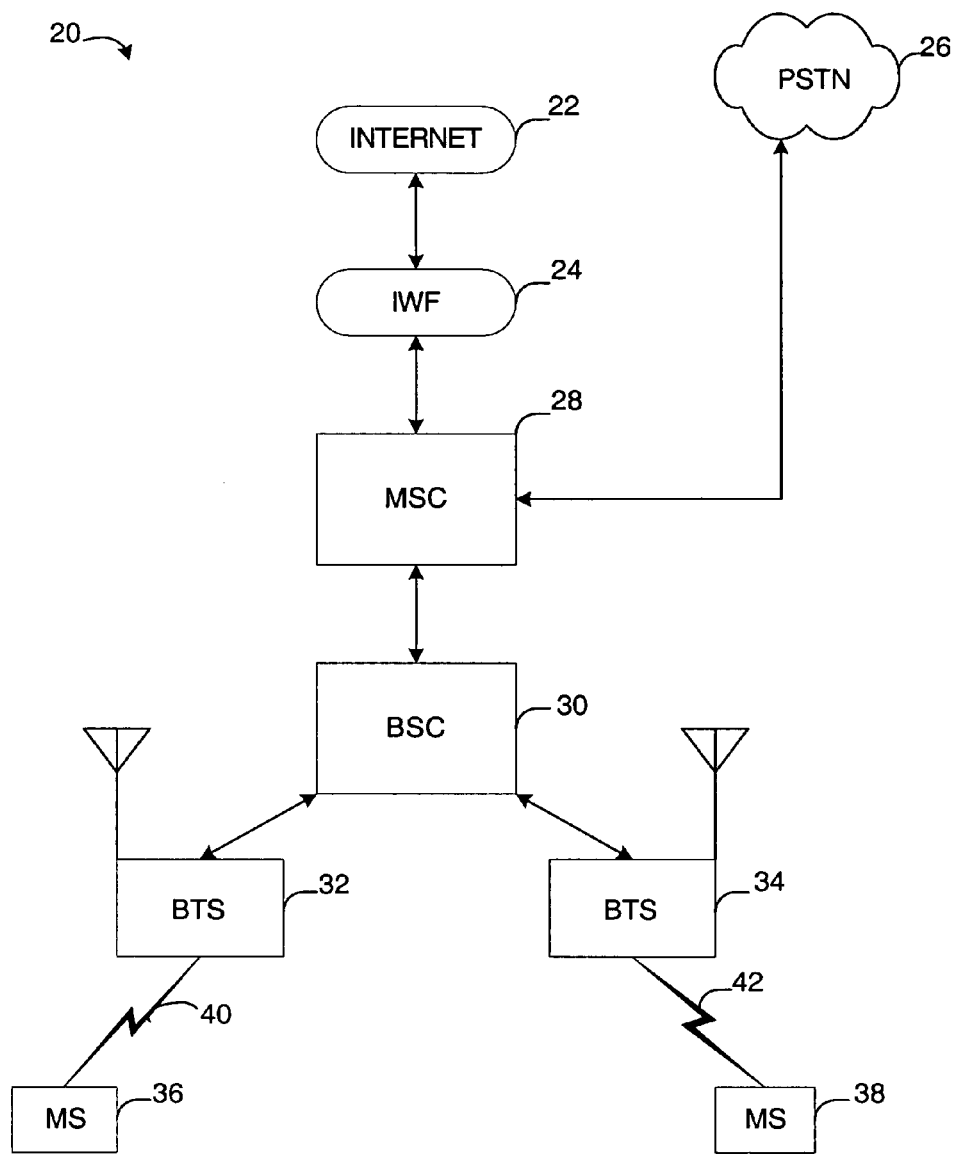
FIG. 1 is a diagram of a communication system having a wired subsystem and a wireless subsystem.

The word "exemplary" is used exclusively herein to mean "serving as an example, instance, or illustration." Any embodiment described herein as "exemplary" is not necessarily to be construed as preferred or advantageous over other embodiments.

In a spread-spectrum wireless communication system, such as a cdma2000 system, multiple users transmit to a transceiver, often a base station, in the same bandwidth at the same time. The base station may be any data device that communicates through a wireless channel or through a wired channel, for example using fiber optic or coaxial cables. A user may be any of a variety of devices including but not limited to a PC card, a compact flash, an external or internal modem, or a wireless or a wireline phone. A user is also referred to as a remote station. The communication link through which the user transmits signals to the transceiver is called a Reverse Link, RL. The communication link through which a transceiver sends signals to a user is called a Forward Link, FL. As each user transmits to and receives from the base station, other users are concurrently communicating with the base station. Each user's transmissions on the FL and/or the RL introduces interference to other users. To overcome interference in the received signals, a demodulator seeks to maintain a sufficient ratio of bit energy to interference power spectral density, $E_b/N_0$, in order to demodulate the signal at an acceptable probability of error. Power Control, PC, is a process that adjusts the transmitter power of one or both of the Forward Link, FL, and the Reverse Link, RL, to satisfy a given error criteria. Ideally, the power control process adjusts the transmitter power(s) to achieve at least the minimum required $E_b/N_0$ at the designated receiver. Still further, it is desirable that no transmitter uses more than the minimum $E_b/N_0$. This ensures that any benefit to one user achieved through the power control process is not at the unnecessary expense of any other user.

For clarity PC information sent via the FL will be referred to as "FL PC commands" and PC information sent via the RL will be referred to as "RL PC commands." The FL PC commands provide PC information for control of the RL transmit power. The RL PC commands provide PC information for control of the FL transmit power.

In a spread-spectrum system, such as a CDMA system, performance of the system is interference-limited. The capacity of the system and the quality of the system are, therefore, limited by the amount of interference power present in a transmission. Capacity is defined as the total number of simultaneous users the system can support, and quality as the condition of the communication link as perceived by the receiver. Power control impacts the capacity of the system by ensuring that each transmitter only introduces a minimal amount of interference to other users and thus increases "processing gain." Processing gain is the ratio of the transmission bandwidth, W, to the data rate, R. A quality measure of the transmission link may be defined as the ratio of $E_b/N_0$ to W/R, corresponding to the Signal-to-Noise Ratio, SNR. Processing gain overcomes a finite amount of interference from other users, i.e., total noise. System capacity is, therefore, proportional to processing gain and SNR.

FIG. 1 illustrates a wireless communication system 20, wherein in one embodiment system 20 is a cdma2000 system. System 20 includes two segments: a wired subsystem and a wireless subsystem. The wired subsystem is the Public Switched Telephone Network, PSTN 26, and the Internet 22. The Internet 22 portion of the wired subsystem interfaces with the wireless subsystem via Inter-Working Function Internet, IWF 24. The ever-increasing demand for data communications is typically associated with the Internet and the ease of access to the data available thereby. However, advancing video and audio applications increase the demand for transmission bandwidth.

The wired subsystem may include but is not limited to other modules such as an instrumentation unit, a video unit, etc. The wireless subsystem includes the base station subsystem, which involves the Mobile Switching Center, MSC 28, the Base Station Controller, BSC 30, the Base Transceiver Station(s), BTS(s) 32, 34, and the Mobile Station(s), MS(s) 36, 38. The MSC 28 is the interface between the wireless subsystem and the wired subsystem. It is a switch that talks to a variety of wireless apparatus. The BSC 30 is the control and management system for one or more BTS(s) 32, 34. The BSC 30 exchanges messages with the BTS(s) 32, 34 and the MSC 28. Each of the BTS(s) 32, 34 consist of one or more transceivers placed at a single location. Each of the BTS(s) 32, 34 terminates the radio path on the network side. The BTS(s) 32, 34 may be in co-located with BSC 30 or may be independently located.

Figure 2:
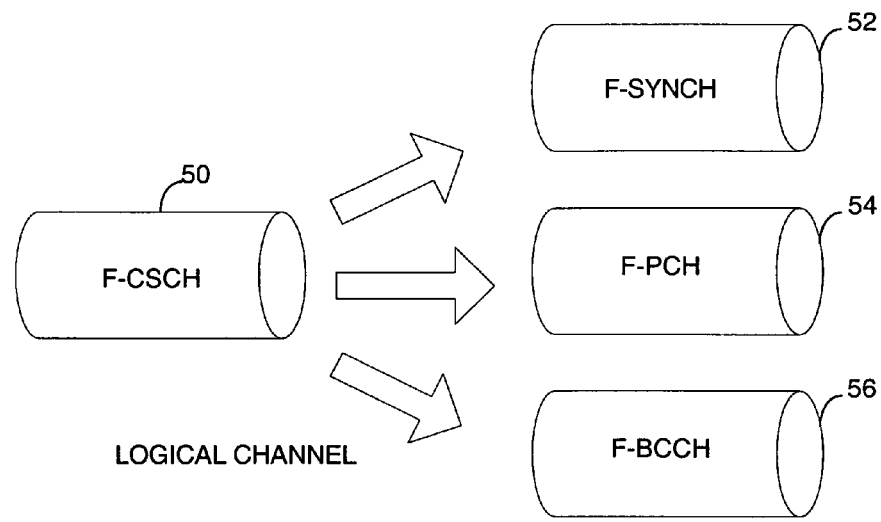
FIG. 2 is a diagram of an architectural model of a Reverse Link channel is a communication system.

The system 20 includes radio air interface physical channels 40, 42 between the BTS(s) 32, 34 and the MS(s) 36, 38. The physical channels 40, 42 are communication paths described in terms of the digital coding and RF characteristics. According to one embodiment, in addition to the physical channels 40, 42, the system 20 incorporates logical channels, such as that illustrated in FIG. 2. Each logical channel is a communication path within the protocol layers of either the BTS(s) 32, 34 or the MS(s) 36, 38. Information is grouped onto a logical channel based upon criteria such as the number of users, the transmission type, the direction of the transfer, etc. The information on a logical channel is ultimately carried on one or more physical channels. Mappings are defined between logical and physical channels. These mappings may be permanent or may be defined only for the duration of a given communication. In the exemplary logical channel of FIG. 2, a forward common signaling channel, F-CSCH 50, carries information that may be mapped to the Forward Sync Channel, F-SYNCH 52, the Forward Paging Channel, F-PCH 54, and the Forward Broadcast Control Channel, F-BCCH 56.

Figure 3:
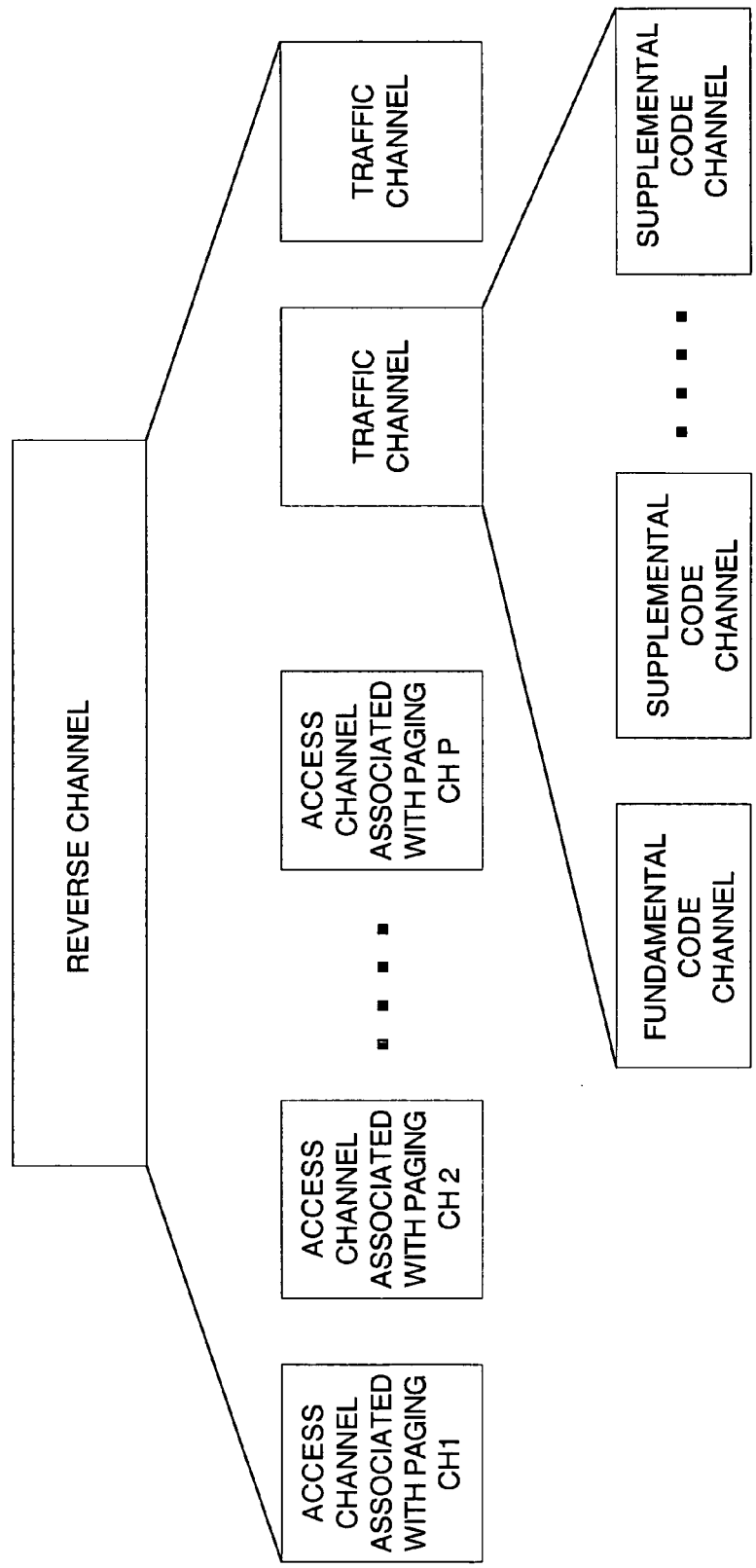
FIG. 3 is diagram of an architectural model of a logical channel in a communication system.

As discussed hereinabove, a FL is defined as a communication link for transmissions from one of the BTS(s) 32, 34 to one of the MS(s) 36, 38. An RL is defined as a communication link for transmissions from one of the MS(s) 36, 38 to one of the BTS(s) 32, 34. According to one embodiment, power control within system 20 includes controlling transmit power for both the RL and the FL. Multiple power control mechanisms may be applied to the FL and RL in system 20, including reverse open loop power control, reverse closed loop power control, forward closed loop power control, etc. Reverse open loop power control adjusts the initial access channel transmission power of MS(s) 36, 38, and compensates for variations in path loss attenuation of the RL. The RL uses two types of code channels: traffic channel(s), and access channel(s). FL and RL traffic channels typically include a Fundamental Code Channel, FCCH, and multiple Supplemental Code Channels, SCCHs. The FCCH serves as the primary channel for all traffic communications in the FL and RL. In one embodiment, each FCCH is associated with an instance of a spreading code, such as a Walsh code. RL Access Channel(s), RACH(s), are each associated with a Paging Channel, PCH. FIG. 3 illustrates an RL channel architecture according to one embodiment.

According to one embodiment, within system 20, closed loop power control compensates for fading environments of both the FL and RL. During closed loop power control, the receiver measures the incoming $E_b/N_0$ and provides feedback to the transmitter instructing either an increase or decrease in transmit power. In one embodiment the change is made in 1 dB steps. Alternate embodiments may employ alternate values of a constant value step, or may implement dynamic step size values, e.g., as a function of power control history. Still other embodiments may vary the step size based on performance and/or requirements of the system 20. Power control of the RL is performed by the BTS(s) 32, 34, wherein a measurement is made of received signals and compared to a threshold. A decision is then made as to whether the power received is above or below threshold. The decision is transmitted as FL PC command to a given user, such as MS(s) 36, 38, respectively. In response to the command, the RL transmit power is adjusted. During closed loop power control of the RL, FL PC commands may be punctured into the FL transmission periodically to provide the feedback to the MS(s) 36, 38. Puncturing replaces transmission signals with FL PC commands. The puncturing may be done within each frame, wherein a transmission is broken into frames of a given time duration.

Figure 4:
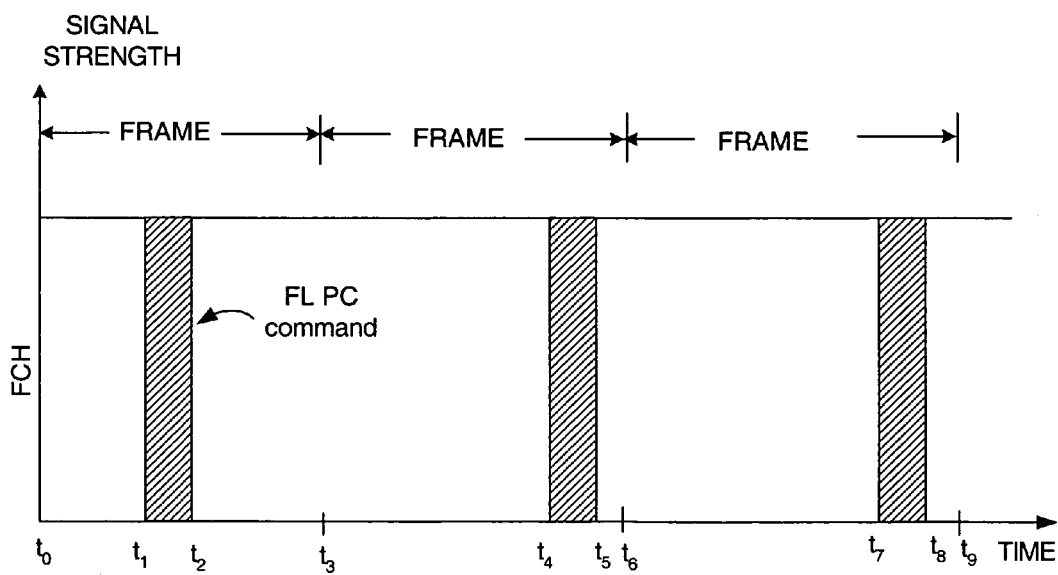
FIG. 4 is a timing diagram of power control on a dedicated channel in a communication system.

The system 20 is designed for transmission of voice information, data information, and/or both voice and data. FIG. 4 illustrates a Fundamental Channel, FCH, for voice-containing communications. The signal strength of the FCH is illustrated as a function of time. A first frame is illustrated from time $t_0$ to time $t_3$. Subsequent frames are illustrated from time $t_3$ to $t_6$, and $t_6$ to $t_9$, respectively. The first frame includes a FL PC command that was punctured in from time $t_1$ to $t_2$. The punctured PC bit replaces information transmitted during that time. Similarly, PC bits are punctured into the subsequent frame from $t_4$ to $t_5$, and the next frame from $t_7$ to $t_8$. Note that a power control instruction may be completed over multiple frames. In one embodiment, the FL PC commands are placed in a pseudo-random manner. In alternate embodiments, the FL PC commands may be placed in fixed time slots or relative time slots.

For power control of the FL, RL PC commands are provided to the BTS(s) 32, 34 from the MS(s), 36, 38, respectively. Closed loop power control of the FL counts the number of bad frames received during a given period and sends a report to the BTS(s) 32, 34. The message may be sent periodically, or when the error rate reaches a threshold, wherein the threshold is set by the system 20. In one embodiment, each frame transmitted by the MS(s) 36, 38 contains an Erasure Indicator Bit (EIB) that is set to indicate an erasure. The FL power is adjusted based on the EIB history.

Closed loop power control consists of two feedback loops: an inner loop and an outer loop. The outer loop measures the frame error rate and periodically adjusts a setpoint up or down to maintain the target frame error rate. If the frame error rate is too high, the setpoint is increased and if the frame error rate is too low, the setpoint is decreased. The inner loop measures the received signal level and compares it to the setpoint. Power control commands are then sent to increase or decrease power as needed to keep the received signal level close to the setpoint. The two loops operate in concert to ensure sufficient signal strength to demodulate the signal at an acceptable probability of error and to minimize the interference to other users.

The FL includes Common Channels, including but not limited to the Pilot Channel(s), the Common Control Channel, CCH, the Broadcast Channel, BCH, and the Common Power Control Channel, CPCCH. The CCH carries mobile directed messages for compatible mobiles. The BCH carries broadcast messages for compatible mobiles, including overhead messages. The CPCCH is used to send Power Control, PC, bits to the mobile so that ACH messages may be sent under power control.

Most multiple access wireless communication systems, such as spread spectrum systems, capable of voice and data transmissions seek to optimize the physical channel usage in order to serve high data rates to the users. Such systems may employ a low rate channel, referred to as a Fundamental Channel, FCH. The FCH is used for voice and signaling transmissions. Each FCH is associated with multiple high rate channels, referred to as Supplemental Channels. The Supplemental Channels are used for data transmissions. While the FCH use little energy, each FCH requires a dedicated Walsh code, resulting in a large aggregate energy over multiple FCH. For data communications the FCH are idle much of the time. In this condition, the FCH waste Walsh codes and power that could be used to increase the capacity and performance of the system. To avoid the waste, one embodiment assigns several FCH(s) to one or more common channels, shared by all users. The Walsh code usage, or Walsh space, is reduced to one Walsh code, and the power consumed by otherwise idle FCH(s) is reduced.

As power control instructions were previously transmitted on the individually assigned FCH(s), the introduction of the shared common channels brought about the use of a Common Power Control Channel, CPCCH. The CPCCH is used for power control of the RL, wherein different users share the channel in a time division manner. FL PC commands are sent via the CPCCH.

Figure 5:
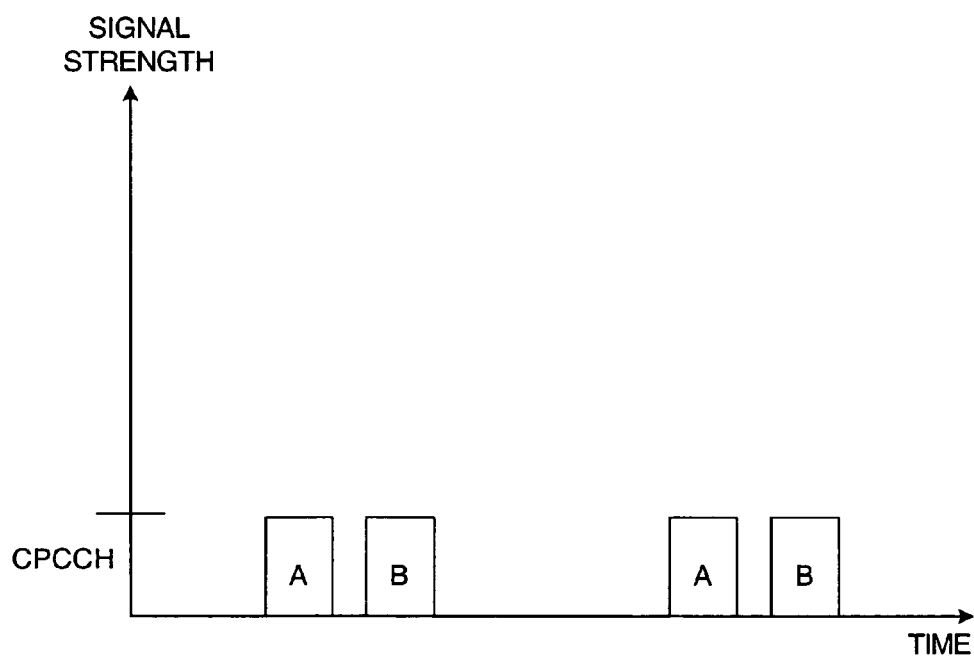
FIG. 5 is a timing diagram of power control on a shared control channel in a communication system.

FIG. 5 illustrates the placement of FL PC commands for mobile users labeled A and B. The FL PC commands are transmitted on the CPCCH and are plotted as a function of time. The FL PC commands are transmitted at full power or a predetermined power level. The commands for the users A and B are time division multiplexed together on the CPCCH. The placement of the individual FL PC commands may be at a fixed time or may be placed in another manner, such as a pseudo-random manner.

In the system 20 of FIG. 1 the FL PC commands may be transmitted via the Common Power Control Channel, CPCCH, or on a dedicated channel, such as a FCH. The Forward Common Power Control Channel, F-CPCCH, is used to send FL PC commands to the MS(s) 36, 38 that are used to control the Reverse Common Control Channel, R-CCH. As discussed hereinabove, open loop power control is used on the Reverse Access Channel, R-ACH. Each MS(s) 36, 38 repeatedly transmits with increasing power until it receives an acknowledgement from the BTS(s) 32, 34, respectively, or until the maximum number of probes and probe sequence is reached.

It is often desirable to continue power control of the FL, even when no data is transmitted. For example, if only a few frames of data are to be transmitted on the Supplemental Channel, updating power control of the FL enhances the transmission of the Supplemental Channel allowing transmission with the required power and saving power. Additionally, for data transmissions, continuing the power control of the FL provides the data scheduler with information regarding the quality of the link at a given time. This information allows the scheduler to take advantage of the channel using a given scheduling scheme.

Further, it is desirable for the mobile station to ascertain the response of the base station to RL PC commands. Using a shared common channel, the mobile station may not see the effect of the RL PC commands. For example, the mobile station may know the $E_b/N_0$ of the FL subsequent to a series of RL PC commands. The RL PC commands may have been corrupted at the base station receiver. Ideally, the FL includes a power indication that echoes the RL PC commands received at the base station. Using the FCH, the mobile station was able to measure the FCH for such feedback. In one embodiment using the shared common channel, the feedback is provided as a function of the power level of RL PC commands.

Figure 6:
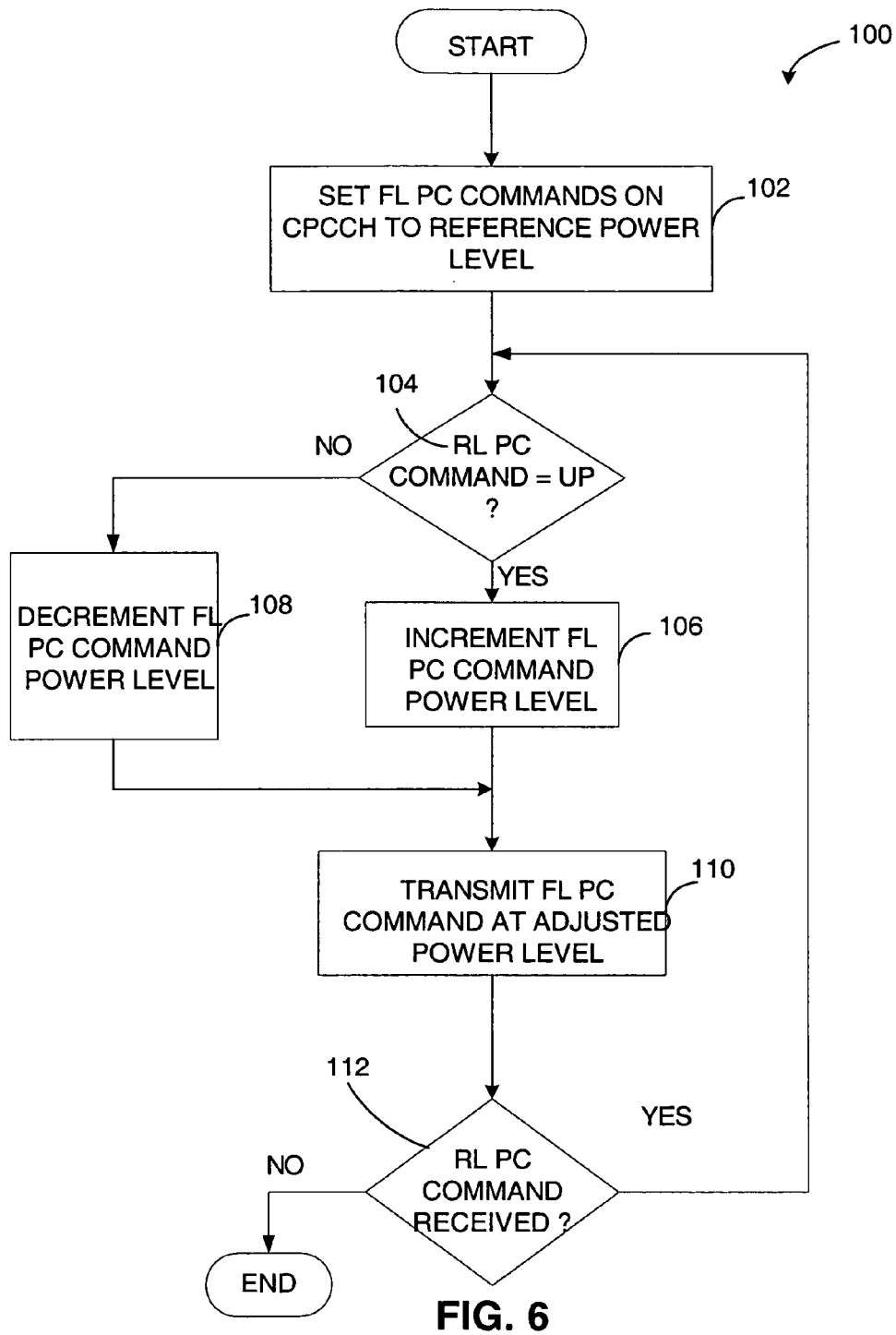
FIG. 6 is a flow diagram of a method of power control in a communication system.

FIG. 6 illustrates a method 100 for power control in system 20, wherein the FL PC commands controlling the RL are transmitted on the CPCCH of the FL. According to method 100, RL PC commands are used to adjust the power level of the FL PC commands. The method 100 initially sets the FL PC command transmission power for the FL to a predetermined reference power level at step 102. On receipt of a RL PC command from the MS a decision is made at step 104 as to whether an UP or DOWN instruction was received. If an UP command was received, the FL PC command power level is incremented at step 106. The increment may be a step value or a function of the previously transmitted power control bit(s) transmitted on the FL. If the RL PC command received was a DOWN instruction, the FL PC command power level FL is decremented at step 108. The decrement may be a step value or a function of the previously transmitted power control bit(s) transmitted on the FL or may be a function of commands received. Subsequent to step 108 or step 106, processing continues to transmit the next FL PC command at the adjusted power level at step 110. If a RL PC command is received at step 112, processing then returns to step 104 to determine the instruction. The method 100 effectively performs FL power control of the FL PC commands. Note that the FL PC command information is not impaired by the power control of method 100. The FL PC command information is used for power control of the RL.

When the base station adjusts the power level of the FL PC command in response to RL PC command, such as according to the method 110 of FIG. 6, the mobile station may use the power level of the FL PC command to make power control decisions estimating the quality of the FL. The mobile station may then use this information to generate power control commands. According to one embodiment, the mobile station measures the SNR of the FL PC bits on the CPCCH. The SNR is then compared to a threshold value. A corresponding power control command is transmitted in response to the comparison. The FL is prepared to transmit at the correct power level, and the base station may use the transmitted power as an indication of channel quality. According to one embodiment, the RL PC command is included in a Data Rate Channel, DRC transmission.

Figure 7:
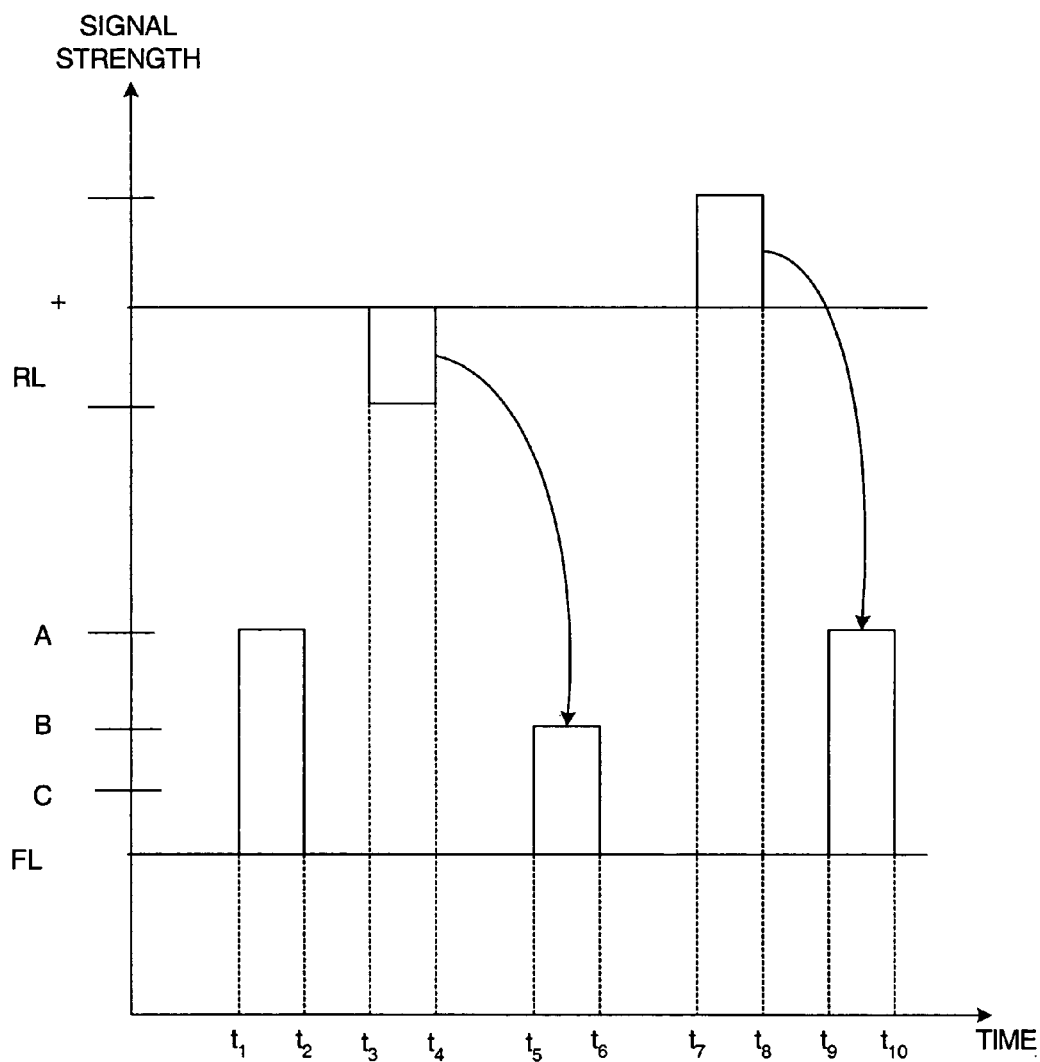
FIG. 7 is a timing diagram of power control of power control bits on a shared control channel in a communication system.

FIG. 7 illustrates a timing scenario implementing the method 100 of FIG. 6. The RL PC command transmissions and the FL PC command transmissions are illustrated as a function of time. A first FL PC command is transmitted from time $t_1$ to $t_2$ at a first power level A. Subsequent to the first FL PC command, an RL PC command is transmitted from time $t_3$ to $t_4$. The RL PC command corresponds to a DOWN command. In response to the DOWN command, the base station decrements the power level of the next transmitted FL PC command. As illustrated, the next FL PC command is transmitted from time $t_5$ to $t_6$ at an adjusted power level B.

Continuing with FIG. 7, at time $t_7$ an RL PC command indicates an UP command. In response to the UP command, the base station increments the power level of the next transmitted FL PC command. As illustrated the power level of the FL PC command transmitted from time $t_9$ to $t_{10}$ is returned to level A.

The method 100 is applicable to a variety of systems and scenarios. For example, the method 100 may be applied to data transmissions in which the base station receives more data from mobile stations than is transmitted on the FL. In one embodiment, a wireless banking system incorporates the method 100 of FIG. 6. A central processing center, similar to the BTS(s) 32, 34 receives information regarding a bank transaction or credit purchase via the RL. Most of the transmissions are performed on the RL; therefore, power control is typically performed on the RL exclusively. In this scenario, power control is implemented on the FL as well and serves to enhance the RL power control. In an alternate embodiment, the method 110 is applied to a distributed meter reporting system, such as a utility meter reporting system. In this case, the central processing center receives information from multiple units or meters.

Figure 8:
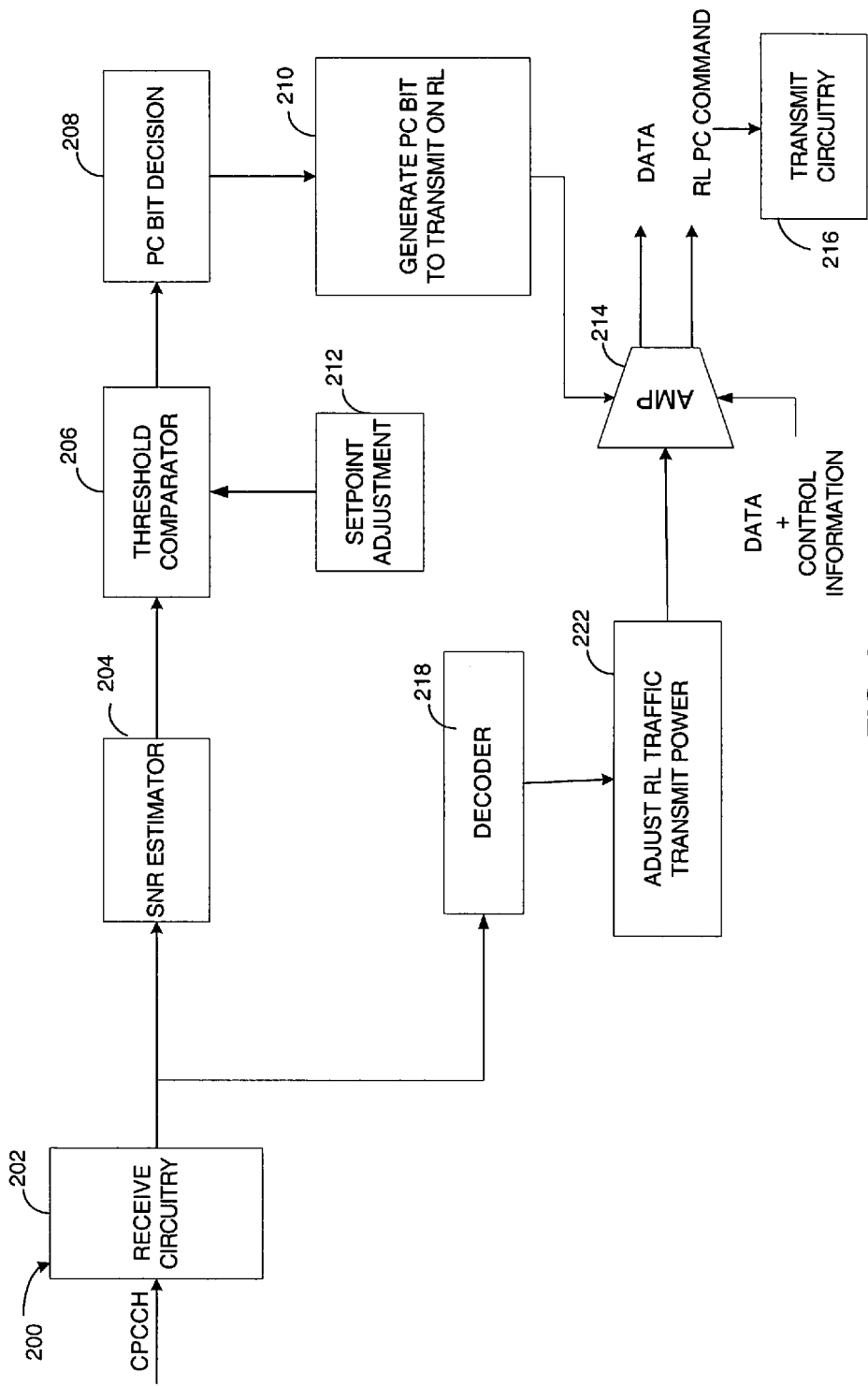
FIG. 8 is a diagram of a wireless apparatus compatible with a communication system protocol performing power control on a common channel of the forward link.

FIG. 8 illustrates an embodiment of a wireless apparatus 200, such as a remote station or a mobile station, compatible with a spread spectrum system implementing a common channel on the FL that transmits power control decisions for the RL, such as a CDMA2000 system. The wireless apparatus 200 is an integral part of power control for both the RL and the FL. As illustrated, the FL PC commands are transmitted via the CPCCH. In alternate embodiments the FL PC commands may be transmitted via an alternate control channel. The FL PC commands provide information containing instructions for power control of the RL. The FL PC commands have been power controlled to reflect the instructions transmitted by the wireless apparatus 200 to a base station (not shown) as RL PC commands for control of the FL. In this way, the RL PC commands effectively perform power control of the FL PC commands. The wireless apparatus 200 receives the FL PC commands, as well as other information via the CPCCH at receive circuitry 202. The receive circuitry 202 may include but is not limited to an antenna or multiple antennas, a preprocessing unit for multiple access communications, a frequency despread unit, and a demodulator.

The receive circuitry 202 is coupled to SNR estimator 204 operative to estimate the $E_b/N_0$ of the received signals. The SNR estimator 204 generates an estimate of $E_b/N_0$ and provides the estimate to a threshold comparator 206. The threshold comparator 206 compares the $E_b/N_0$ estimate to a predetermined or precalculated threshold value, referred to as a setpoint. The setpoint is monitored and updated by a setpoint adjustment unit 212 coupled to the threshold comparator 206. As discussed hereinabove, the setpoint adjustment is a part of the outer loop of power control and is a function of the frame error rate. There are many decision criteria and methods for performing the operation of setpoint adjustment unit 212. The result of the comparison of threshold comparator 206 is provided to PC bit decision unit 208 to determine a next power control instruction to send to the base station. By determining the quality of the FL by way of the FL PC bits received on the CPCCH, the wireless apparatus 200 is able to provide accurate power control instructions to the base station.

The PC bit decision is then provided to generation unit 210 to generate the RL PC bit or RL PC message, for transmission on the RL. The generation unit 210 is coupled to amplifier 214, which receives the RL PC bit from generation unit 210. The amplifier 214 transmits the RL PC bit to transmit circuitry 216. The amplification level is provided by power control of the RL as a result of instructions from the base station. The signal information is provided from the receive circuitry 202 to a decoder 218 for extraction of the power control instruction for the RL. The decoder 218 decodes the information received on the CPCCH and determines the corresponding FL PC command. The FL PC command is then provided to an adjustment unit 222 that adjusts the transmit power of the RL. The adjustment is provided as a control input to amplifier 214, which applies the appropriate amplification factor to data and control information for transmission on the RL. The amplifier 214 also applies the power control to RL PC commands for transmission.

Figure 9:
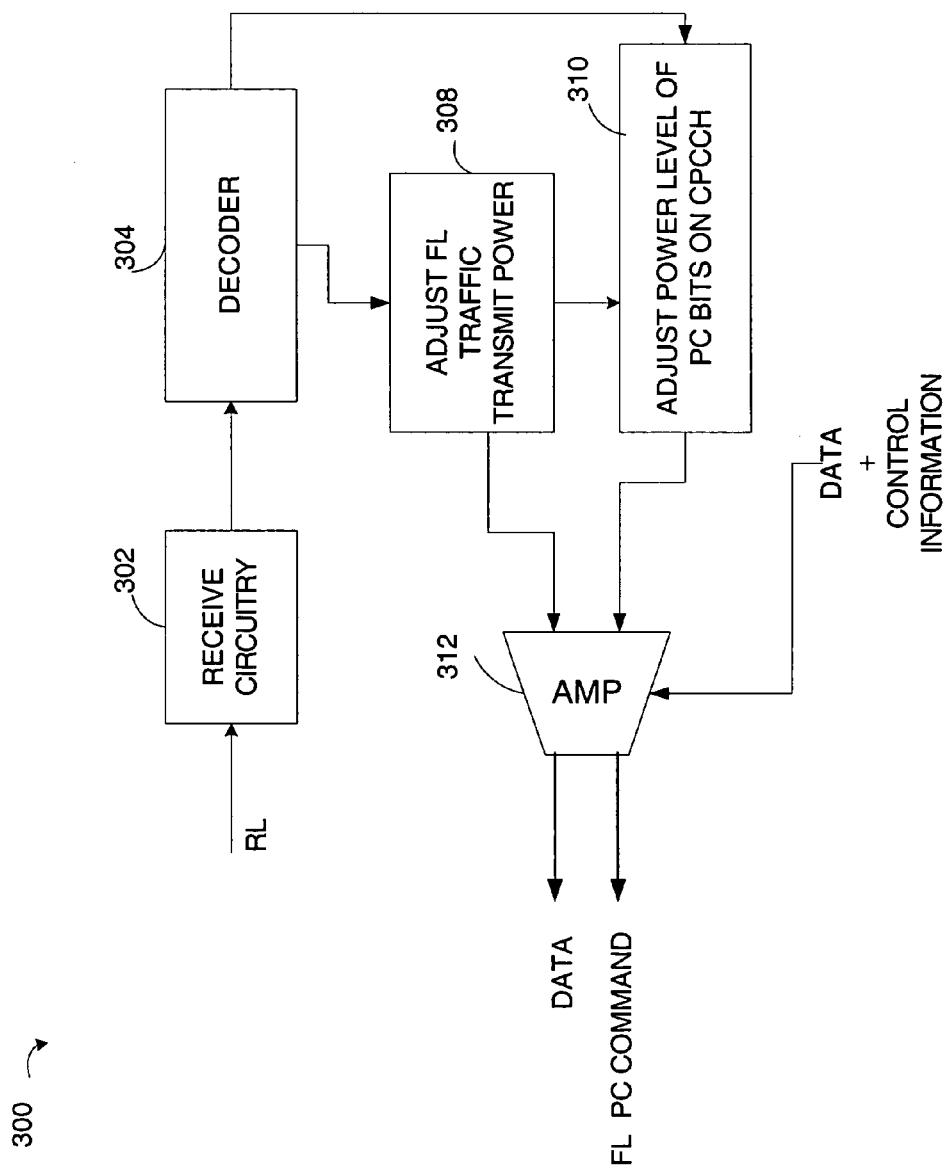
FIG. 9 is a diagram of a base station apparatus compatible with a communication system performing power control on a common channel of the forward link.

One embodiment of a base station 300 compatible with the wireless apparatus 200 is illustrated in FIG. 9. At the base station 300, RL PC bits are received via the RL at receive circuitry 302. The receive circuitry 302 may include but is not limited to an antenna or multiple antennas, a preprocessing unit for multiple access communications, a frequency despread unit, and a demodulator. The receive circuitry 302 is coupled to a decoder 304 that extracts the RL PC command from the received signal. The command is then provided to an adjustment unit 308 to adjust the FL traffic transmit power. The adjustment is provided as control information to amplifier 312. The PC command from decoder 304 is also provided to a PC adjustment unit 310. The adjustment unit 310 adjusts the transmit power level of the PC bits for transmission in the CPCCH according to the RL PC command. The amplifier 312 applies the appropriate amplification factor to data and/or control information for transmission by base station 300 as well as to FL PC commands. Note that base station 300 determines the power control instructions for transmission to the wireless apparatus 200, wherein the power control instructions are PC bits transmitted on the CPCCH. A variety of power control decision mechanisms may be implemented to determine the appropriate power control instructions to control the RL.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
  a determination unit operative to determine a reverse link power control instruction received on a reverse link for base station transmission on a forward link;
  an adjustment unit coupled to the determination unit, the adjustment unit operative to adjust a transmission power level of a forward link power control instruction based on the reverse link power control instruction, wherein the transmission power level of the forward link power control instruction is initially set to a reference value; and
  a transmitter operative to transmit the forward link power control instruction on a forward link common channel, wherein the forward link common channel is shared by a plurality of remote stations.

2. An apparatus comprising:
  a link quality estimation unit operative to generate a link quality estimation in response to a forward link power control instruction received on a forward link common channel, wherein the link quality estimation is a SNR and the apparatus shares the forward link common channel with at least one remote station; and
  a power control unit coupled to the link quality estimation unit, the power control unit operative to generate a reverse link power control instruction in response to the link quality estimation,
  wherein the reverse link power control instruction includes one or more commands configured to adjust a transmit power of the forward link at a base station.

3. A method for power control in a wireless communication system, the method comprising:
  generating a link quality estimation in response to a forward link power control instruction received on a forward link common channel, wherein the link quality estimation is a SNR and the forward link common channel is shared by a plurality of remote stations; and
  generating a reverse link power control instruction in response to the link quality estimation,
  wherein the reverse link power control instruction includes one or more commands configured to adjust a transmit power of the forward link at a base station.

4. A method for power control in a wireless communication system, the method comprising:
  determining a reverse link power control instruction received on a reverse link for base station transmission on a forward link;
  adjusting a transmission power level of a forward link power control instruction based on the reverse link power control instruction, wherein a transmission power level of the forward link power control instruction is initially set to a reference value; and
  transmitting the forward link power control instruction on a forward link common channel, wherein the forward link common channel is shared by a plurality of remote stations.

5. An apparatus comprising:
  means for generating a link quality estimation in response to a forward link power control instruction received on a forward link common channel, wherein the link quality estimation is a SNR and the apparatus shares the forward link common channel with at least one remote station; and
  means for generating a reverse link power control instruction in response to the link quality estimation, wherein the reverse link power control instruction includes one or more commands configured to adjust a transmit power of the forward link at a base station.

6. An apparatus comprising:
means for determining a reverse link power control instruction received on a reverse link for base station transmission on a forward link;
means for adjusting a transmission power level of a forward link power control instruction based on the reverse link power control instruction, wherein the transmission power level of the forward link power control instruction is initially set to a reference value, wherein the means for adjusting are coupled to the means for determining; and
means for transmitting the forward link power control instruction on a forward link common channel, wherein the forward link common channel is shared by a plurality of remote stations.

7. The apparatus of claim 2, wherein the link quality estimation unit is operative to generate the link quality estimation based on a received power level of the forward link power control instruction.

8. The apparatus of claim 1, wherein the reverse link power control instruction is extracted from a signal received on the reverse link.

9. The method of claim 3, wherein the link quality estimation is generated based on a received power level of the forward link power control instruction.

10. The method of claim 4, wherein the determination comprises extracting the reverse link power control instruction from a signal received on the reverse link.

11. The apparatus of claim 5, wherein the means for generating a link quality estimation are for generating the link quality estimation based on a received power level of the forward link power control instruction.

12. The apparatus of claim 6, wherein the reverse link power control instruction is extracted from a signal received on the reverse link.

13. A machine-readable medium embodying a method for power control in a remote station, the method comprising:
generating a link quality estimation in response to a forward link power control instruction received on a forward link common channel, wherein the link quality estimation is a SNR and the remote station shares the forward link common channel with at least one other remote station; and
generating a reverse link power control instruction in response to the link quality estimation,
wherein the reverse link power control instruction includes one or more commands configured to adjust a transmit power of the forward link at a base station.

14. A remote station, comprising:
a link quality estimation unit operative to generate a link quality estimation in response to a forward link power control instruction received on a forward link common channel, wherein the link quality estimation is a SNR and the remote station shares the forward link common channel with at least one other remote station;
a power control unit coupled to the link quality estimation unit, the power control unit operative to generate a reverse link power control instruction in response to the link quality estimation; and
one or more antennas configured to receive the forward link power control instruction on the forward link,
wherein the reverse link power control instruction includes one or more commands configured to adjust a transmit power of the forward link at a base station.

15. A machine-readable medium embodying a method for power control in a base station, the method comprising:
determining a reverse link power control instruction received on a reverse link for base station transmission on a forward link;
adjusting a transmission power level of a forward link power control instruction based on the reverse link power control instruction, wherein the transmission power level of the forward link power control instruction is initially set to a reference value; and
transmitting the forward link power control instruction on a forward link common channel, wherein the forward link common channel is shared by a plurality of remote stations.

16. A base station, comprising:
a determination unit operative to determine a reverse link power control instruction received on a reverse link for base station transmission on a forward link;
an adjustment unit coupled to the determination unit, the adjustment unit operative to adjust a transmission power level of a forward link power control instruction based on the reverse link power control instruction, wherein the transmission power level of the forward link power control instruction is initially set to a reference value;
one or more antennas configured to receive the reverse link power control instruction on the reverse link; and
a transmitter operative to transmit the forward link power control instruction on a forward link common channel, wherein the forward link common channel is shared by a plurality of remote stations.

17. The apparatus of claim 2, wherein the forward link power control instruction and another forward link power control instruction for the at least one remote station are multiplexed on the forward link common channel.

18. The apparatus of claim 1, wherein the forward link power control instruction and other forward link power control instructions for the plurality of remote stations are multiplexed on the forward link common channel.

19. The method of claim 3, wherein the forward link power control instruction and other forward link power control instructions for the plurality of remote stations are multiplexed on the forward link common channel.

20. The method of claim 4, wherein the forward link power control instruction and other forward link power control instructions for the plurality of remote stations are multiplexed on the forward link common channel.

21. The apparatus of claim 5, wherein the forward link power control instruction and another forward link power control instruction for the at least one remote station are multiplexed on the forward link common channel.

22. The apparatus of claim 6, wherein the forward link power control instruction and other forward link power control instructions for the plurality of remote stations are multiplexed on the forward link common channel.

23. The machine-readable medium of claim 13, wherein the forward link power control instruction for the remote station and another forward link power control instruction for the at least one other remote station are multiplexed on the forward link common channel.

24. The machine-readable medium of claim 15, wherein the forward link power control instruction and other forward link power control instructions for the plurality of remote stations are multiplexed on the forward link common channel.

25. The remote station of claim 14, wherein the forward link power control instruction for the remote station and another forward link power control instruction for the at least one other remote station are multiplexed on the forward link common channel.

26. The base station of claim 16, wherein the forward link power control instruction and other forward link power control instructions for the plurality of remote stations are multiplexed on the forward link common channel.

27. The apparatus of claim 2, wherein the apparatus controls transmission power of the reverse link power control instruction on a reverse link in response to the forward link power control instruction.

28. The apparatus of claim 2, wherein the apparatus transmits the reverse link power control instruction on a reverse link.

29. The method of claim 3, further comprising controlling transmission power of the reverse link in response to the forward link power control instruction.

30. The method of claim 3, further comprising transmitting the reverse link power control instruction on the reverse link.

31. The apparatus of claim 5, further comprising means for controlling transmission power of the reverse link power control instruction on a reverse link in response to the forward link power control instruction.

32. The apparatus of claim 5, further comprising means for transmitting the reverse link power control instruction on a reverse link.

* * * * *